United States Patent
Khan et al.

(10) Patent No.: US 8,059,340 B2
(45) Date of Patent: Nov. 15, 2011

(54) METHOD AND SYSTEM FOR REDUCING SPECKLE BY VIBRATING A LINE GENERATING ELEMENT

(75) Inventors: Sajjad A. Khan, Plano, TX (US); Steven Paul Krycho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 666 days.

(21) Appl. No.: 11/961,841

(22) Filed: Dec. 20, 2007

(65) Prior Publication Data
US 2009/0034037 A1   Feb. 5, 2009

Related U.S. Application Data

(60) Provisional application No. 60/953,415, filed on Aug. 1, 2007.

(51) Int. Cl.
*G02B 27/10* (2006.01)

(52) U.S. Cl. .................. 359/619; 359/623

(58) Field of Classification Search .............. 359/599, 359/618, 619, 620, 623, 710
See application file for complete search history.

(56) References Cited

U.S. PATENT DOCUMENTS

| | | | | |
|---|---|---|---|---|
| 6,081,381 | A * | 6/2000 | Shalapenok et al. | 359/619 |
| 6,466,368 | B1 * | 10/2002 | Piepel et al. | 359/619 |
| 6,594,090 | B2 * | 7/2003 | Kruschwitz et al. | 359/707 |
| 6,724,535 | B1 * | 4/2004 | Clabburn | 359/619 |
| 7,202,466 | B2 * | 4/2007 | Babayoff et al. | 359/629 |

* cited by examiner

*Primary Examiner* — Alicia M Harrington
(74) *Attorney, Agent, or Firm* — Charles A. Brill; Wade J. Brady, III; Frederick J. Telecky, Jr.

(57) ABSTRACT

Provided is a method and system for reducing speckle in an image produced from a light source. The method, in one embodiment, includes providing a line generating element, the line generating element having a collection of optical elements having an axis. The method, in this embodiment, further includes directing an input beam of light at the line generating element while the line generating element is being vibrated back and forth in a direction substantially transverse to the axis.

9 Claims, 2 Drawing Sheets

METHOD AND SYSTEM FOR REDUCING SPECKLE BY VIBRATING A LINE GENERATING ELEMENT

CROSS-REFERENCE TO PROVISIONAL APPLICATION

This application claims the benefit of U.S. Provisional Application Ser. No. 60/953,415, filed Aug. 1, 2007 entitled "METHODS AND TECHNIQUES FOR DESPECKLING LASER LIGHT USED IN DISPLAY IMAGING SYSTEMS," filed by Sajjad Ali Khan, et al., commonly assigned herewith and incorporated herein by reference.

TECHNICAL FIELD

The disclosure is directed, in general, to reducing speckle and, more specifically, to reducing speckle in an image produced from a light source.

BACKGROUND

Televisions and other types of imaging systems are pervasive in today's society. Recent years have seen the introduction of higher definition imaging systems. Engineers continue to try to increase the resolution and brightness of imaging systems to provide better picture quality, but also face constraints associated with providing such increased resolution and brightness.

For example, to increase brightness in imaging display systems, coherent light sources (lasers as one example) have been introduced in the place of incoherent light sources (light-emitting-diodes (LEDs) and lamps, as an example). However, while coherent light sources may increase the brightness of the display system, such light sources often produce images having a noticeable granularity. This grainy pattern, also known as speckle or the scintillation effect, arises due to the highly narrowband and polarized nature of the coherent light incident on a diffuse surface. Speckle has been attributed to the fact that coherent light reflected by or through a diffusing produces a complex, random, but stationary diffraction pattern. Specifically, speckle originates when the coherent plane phase front from a laser traverses through a medium with optical path length differences that are less than or equal to the coherence length of the laser. Such path length differences can occur as a result of surface roughness, scratches, digs, and polishing imperfections in optical elements.

Generally, two different types of speckle exist, namely objective speckle and subjective speckle. Objective speckle arises from the uneven illumination of the object. An object in this scenario may be a Spatial Light Modulator (SLM) such as a Digital Micromirror Device (DMD). When objective speckle exists, even the most perfect optical system can do no better than to reproduce it exactly. On the other hand, subjective speckle arises in the case of an evenly illuminated rough object. Objective speckle exists for almost any light source, while subjective speckle, although it can be present for any source, is worse for a narrowband and polarized source (e.g., a laser).

Accordingly, what is needed is a method and system configured to reduce speckle.

SUMMARY

To address the above-discussed deficiencies, provided is a method and system for reducing speckle in an image produced from a light source. The method, in one embodiment, includes providing a line generating element, the line generating element having a collection of optical elements with an axis. The method, in this embodiment, further includes directing an input beam of light at the line generating element while the line generating element is being vibrated back and forth in a direction substantially transverse to the axis.

Additionally provided is the system. The system, without limitation, includes: (1) a light source operable to transmit an input beam of light, (2) a line generating element in optical communication with the input beam of light, the line generating element having a collection of optical elements configured to convert the input beam of light into one or more individual line beams of light (e.g., line shaped or stripe shaped), (3) a vibration source coupled to the line generating element, the vibration source configured to vibrate the line generating element back and forth in a direction substantially transverse to an axis of the collection of optical elements, (4) a spatial light modulator positioned in optical communication with the line generating element, the spatial light modulator configured to modulate the individual line beams of light, and (5) a display screen positioned to receive the modulated individual line beams of light. The term "input beam of light" here refers to traditional light beams as emitted by light sources such as arc lamps, light emitting diodes (LED) and laser, among others. These input beams of light may have different shapes, such as elliptical, round, among others, and a variety of intensity profiles, such Lambertian and Gaussian, among others.

BRIEF DESCRIPTION OF THE DRAWINGS

For a more complete understanding of the embodiments discussed herein, reference is now made to the following descriptions taken in conjunction with the accompanying drawings, in which.

DETAILED DESCRIPTION

Figure 1:
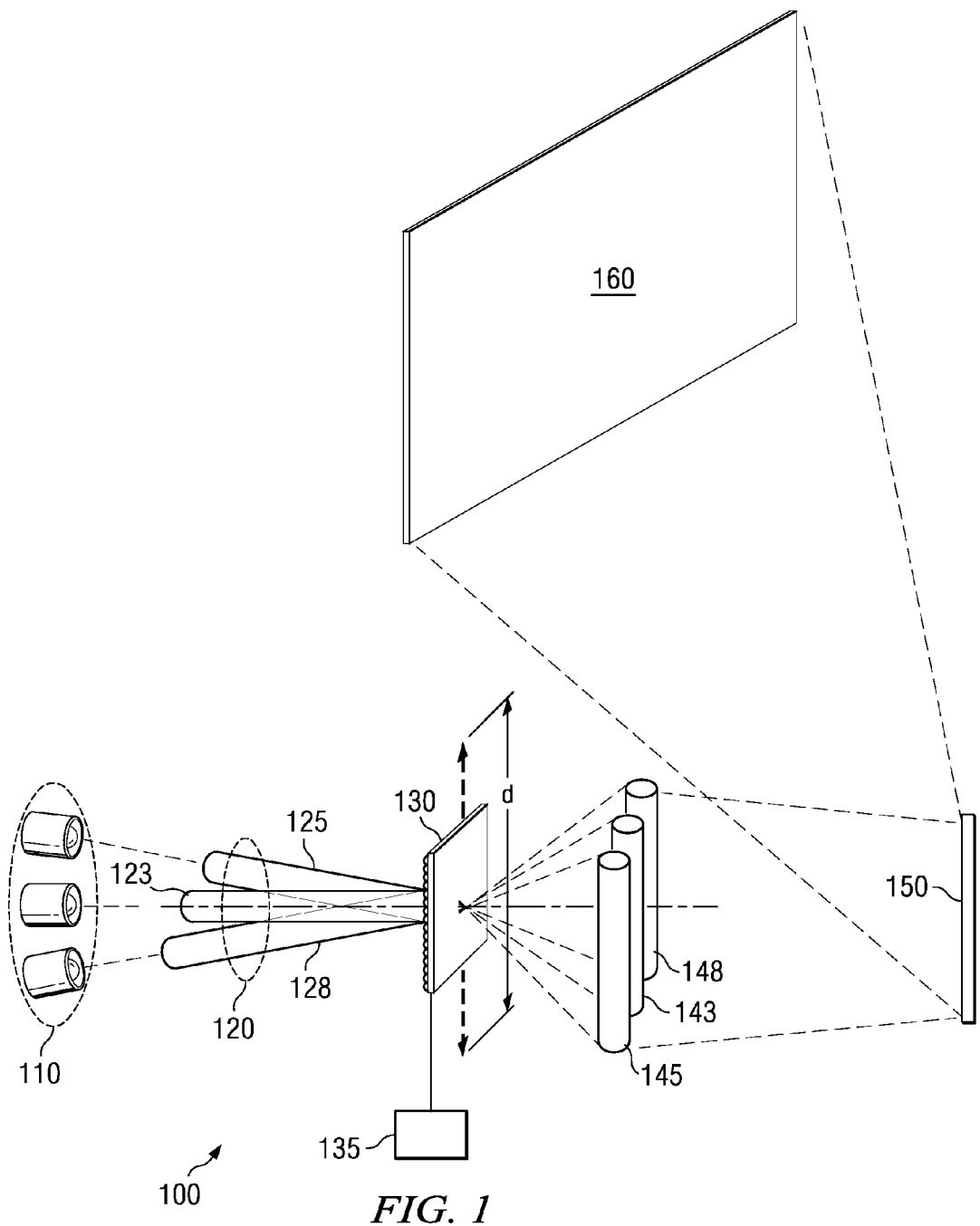
FIG. 1 illustrates a system manufactured in accordance with this disclosure.

When a visible light beam, such as a coherent light beam from a laser, illuminates a fixed diffuse reflecting surface, such as a matte white screen, the illuminated area has a sparkling appearance. The same observation can be made when such a light beam is directed onto a stationary diffuse optical transmission surface such as a rear projection display screen. The sparkling appearance results in images having a noticeable granularity. This grainy pattern is also referred to as speckle or the scintillation effect.

One approach to diminish the visibility of speckle, particularly objective speckle, uses motion to break up the stationary diffraction pattern caused by the light. In such a system, one or more elements having diffusion properties are continually moved relative to other elements of the imaging system. For example, in one existing system, a rotating diffusive optical element is positioned within an optical path between the coherent light source and a line generating element. Because the diffusive optical element is continually rotating in either a clockwise or counter clockwise direction, speckle (e.g., objective speckle mainly) is somewhat reduced.

This disclosure recognizes that the inclusion of the rotating diffusive element to reduce the objective speckle significantly reduces a brightness of the resulting image. Thus, while the rotating diffusive element improves the issues related to objective speckle, among other types of speckle, it has a significant negative impact on the resulting brightness of the image. As the brightness of an image is closely tied to image quality, a solution is desirous.

Based at least partially on the aforementioned recognition, as well as substantial experimentation, the disclosure further recognizes that similar (if not better) objective speckle improvement, without the significant loss of brightness, can be obtained by vibrating the traditionally fixed line generating element. For example, the disclosure recognizes that by vibrating (e.g., moving, translating, etc.) the line generating element back in forth in a direction transverse to an axis of optical elements (e.g., repeatable optical elements) thereof, that both improved objective speckle reduction and improved brightness may be obtained. In one example embodiment, the line generating element is vibrated a distance equal to at least about a maximum pitch of the optical elements. If the optical elements are repeatable optical elements having a fixed pitch, the line generating element might be vibrated a distance equal to at least the fixed pitch. In another example embodiment, an amount of time it takes for the line generating element to travel the distance is equal to or greater than about a human retina response time.

The optical axes of the individual optical elements that constitute line generating element may be substantially parallel in some embodiments. Yet, there may be other embodiments where the optical axes of the individual optical elements that constitute line generating element are not substantially parallel. The term "substantially parallel", as used throughout this disclosure, means that the optical elements are less than about 5 degrees from being exactly parallel.

The disclosed vibration, in one embodiment, will move a point spread function generated by a single optical element that constitutes the line generating element, in its focal plane. If the speed of the employed vibration is faster than the human retina response time, while at the same time the distance of travel is at least equal to the maximum pitch, then the objective speckle pattern can be averaged by the human eye. This helps to solve both problems (e.g., line generation and objective speckle reduction) simultaneously in a single optical element. Moreover, the vibration of the line generating element has, in certain embodiments, about 15% to about 20% more optical throughput, or more, than traditional structures using spinning diffusers.

FIG. 1 illustrates a system 100 manufactured in accordance with this disclosure. A system, such as the system 100, may be configured to reduce speckle (e.g., objective speckle) while maintaining (or even increasing) the brightness for an optical image thereof. Accordingly, the system 100 does not experience certain drawbacks of existing systems.

The system 100 initially includes a light source 110 capable of generating a light beam 120 (e.g., a coherent light beam, such as a laser light beam in certain embodiments). In particular embodiments, the light source 110 includes one or more lasers that direct the light beam 120 towards a line generating element 130. The one or more lasers, in the example embodiment shown, cause the light beam 120 to include a red light sub-beam 123, a green light sub-beam 125 and a blue light sub-beam 128. Those skilled in the art understand that other light sub-beams, including magenta, cyan, etc., may comprise at least a portion of the light beam 120.

The light beam 120, in the example embodiment, is being directed toward the line generating element 130. The term "line generating element", as used throughout this disclosure, means any modulating element that takes at least one traditional beam of light and converts it into one or more line-shaped or stripe-shaped beams of light. Line generating elements tend to include a collection (e.g., array in one embodiment) of optical elements. For example, the optical elements may be repeatable optical elements having a substantially fixed pitch (p), as well as be aligned along an axis. The phrase "substantially fixed pitch", as used herein, means that the pitch (p) of each repeatable optical element is substantially fixed, as might occur if one skilled in the art were using standard manufacturing processes to manufacture identical pitches. However, the optical elements may additionally have a varied pitch.

The line generating element 130 may be configured in many different ways and remain within the purview of the disclosure. In one embodiment, the line generating element 130 comprises a lenticular array or cylindrical lenslet array, such as is shown in FIG. 1. A lenticular array may include an array of cylindrical lenslets having a fixed pitch or a varied pitch, as well as being positioned along an axis. The array of cylindrical lenslets, in this embodiment, are configured to produce individual line beams of light, for example the red line beam 143, the green line beam 145 and the blue line beam 148, among others.

Alternatively, the same functionality as the lenticular array may be achieved by either waveguides, beads, prisms or holographic elements, for example to essentially achieve the same effect. Therefore, in an alternative embodiment, the line generating element 130 comprises a diffractive optical element, among others, as opposed to the lenticular array.

Figure 2A:
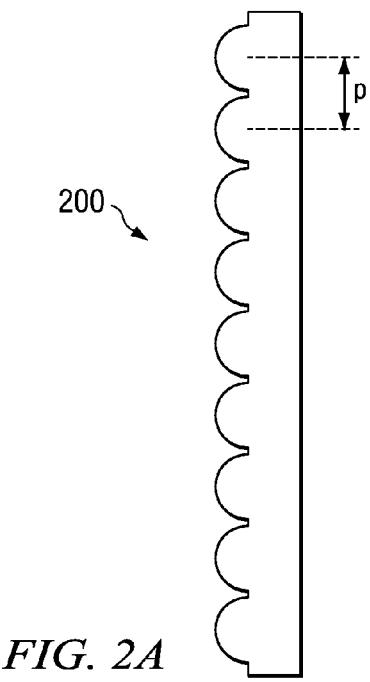
FIGS. 2A and 2B illustrate various different configurations for a line generating element manufactured and used in accordance with this disclosure.
Figure 2B:
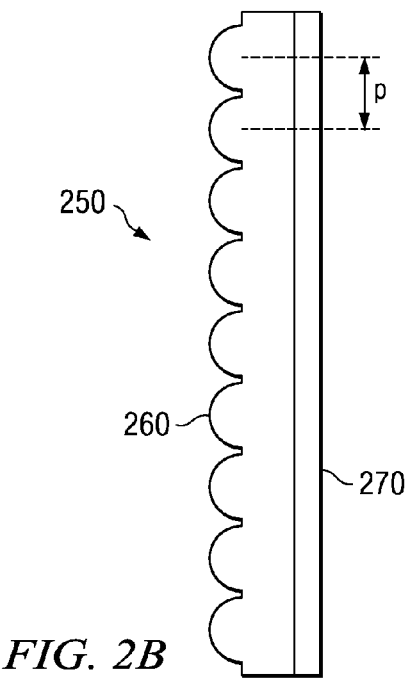

FIGS. 2A and 2B illustrate various different configurations for the line generating element, one of which might be similar to the line generating element 130 of FIG. 1. While the line generating elements 200, 250 shown in FIGS. 2A and 2B are depicted as lenticular arrays, those skilled in the art understand that the teachings associated with such FIGS. may be applied to other line generating elements, including the aforementioned diffractive optical element. Each of the line generating elements 200, 250 of FIGS. 2A and 2B includes a fixed pitch (p), as well as an axis (e.g., into the page in this example). Again, however, the pitch (p) of the line generating elements need not always be fixed.

FIG. 2A comprises a line generating element 200 that comprises a single material layer. In this embodiment, the line generating element 200 includes intrinsic diffusive properties. Accordingly, the line generating element 200 of FIG. 2A not only provides the desirous individual line beams of light, but also has the diffusive properties configured to assist with speckle reduction. Those skilled in the art understand the various different materials that could comprise the line generating element 200. For example, the line generating element 200 may comprise plastic, glass, composite material, or any other appropriate material.

In particular embodiments, the line generating element 200 may have a Full-Width Half Maximum (FWHM) diffusion angle that varies greatly. For example, in a particular embodiment, the optical properties of the line generating element 200 may include a small FWHM diffusion angle on the order of approximately 0.1 degree. In another example embodiment, the optical properties of the line generating element 200 may include a large FWHM diffusion angle on the order of approximately 40 degrees. In still another example embodiment, the optical properties of the line generating element 200 may vary anywhere between 0.1 and 40 degrees, among others.

FIG. 2B comprises a line generating element 250 that comprises a collection of separate material layers. For instance, the line generating element 250 includes a first line generating material layer 260 that includes little, if any, diffusive properties. Located proximate the first line generating material layer 260, and in this embodiment directly in contact with the line generating material layer 260, is a second diffusive material layer 270. The collection of the first line generating material layer 260 and the second diffusive material layer 270 provides the desired individual line beams of light, as well as the diffusive properties configured to assist with speckle reduction.

In one embodiment, the first line generating material layer 260 comprises acrylic, glass, or any other appropriate optical grade material, and the second diffusive material layer 270 comprises plastic, acrylic, glass, or any other appropriate optical grade material. Moreover, line generating elements don't necessarily have to be transmissive, they can also be reflective in nature while yet performing the same function in principle. Additionally, the optical properties of the line generating element 250 may vary, for example in accordance with those discussed above. Given the teachings herein, those skilled in the art would understand the various different materials and optical properties that might comprise the first line generating material layer 260 and the second diffusive material layer 270.

It should be noted that the line generating elements 200 and 250 of FIGS. 2A and 2B illustrate but a few embodiments. In another embodiment, such as that illustrated in FIG. 1, the line generating element might comprise only a single material layer, but might contain little, if any, diffusive properties. In this example embodiment, no additional diffusive material layer would be used.

Returning to FIG. 1, the system 100 may include a vibration source 135 coupled to the line generating element 130. The vibration source 135, as will be discussed in more detail below, is configured to vibrate the line generating element 130 back in forth in a direction transverse to the axis of the line generating element 130. The vibration source 135 is further configured to move the line generating element 130 a distance (d), and is further configured to move it the distance (d) within a given amount of time.

Various different structures may be used as the vibration source 135. In one embodiment, the vibration source 135 comprises a motor based device. For example, a locomotive type configuration coupled to an AC/DC motor may be used as the motor based device. In another embodiment, a piezoelectric actuator based device may comprise the vibration source. In yet other embodiments, other structures configured to vibrate the line generating element 130 in accordance with this disclosure, might be used.

The system 100 may further include a spatial light modulator (SLM) 150 located in an optical path between the line generating device 130 and a display screen 160. The SLM 150, in the disclosed embodiment, is configured to deflect the individual line beams of light in a predetermined pattern. This pattern represents the image that is ultimately projected or displayed upon the display screen 160. The SLM 150 of FIG. 1 comprises a digital micromirror device (DMD) having an array of micromirrors. Nevertheless, other types of SLMs may be used while staying within the scope of the present disclosure.

Descriptions of the DMD, DMD fabrication, and DMD-based display systems can be found in greater detail in the following coassigned U.S. patents: U.S. Pat. No. 4,566,935, issued Jan. 28, 1986, entitled "Spatial Light Modulator and Method," U.S. Pat. No. 4,615,595, issued Oct. 7, 1986, entitled "Frame Addressed Spatial Light Modulator," U.S. Pat. No. 4,662,746, issued May 5, 1987, entitled "Spatial Light Modulator and Method," U.S. Pat. No. 5,061,049, issued Oct. 29, 1991, entitled "Spatial Light Modulator and Method," U.S. Pat. No. 5,083,857, issued Jan. 28, 1992, entitled "Multi-Level Deformable Mirror Device," U.S. Pat. No. 5,096,279, issued Mar. 17, 1992, entitled "Spatial Light Modulator and Method," and U.S. Pat. No. 5,583,688, issued Dec. 10, 1996, entitled "Multi-Level Digital Micromirror Device," which patents are hereby incorporated herein by reference.

As briefly mentioned, the system 100 further includes the display screen 160. The display screen may comprise part of a rear projection display device or part of a front projection display device, depending on the application. In either embodiment, however, the display screen 160 will ultimately display the image to an intended viewer. Those skilled in the art understand the various different materials and configurations that the display screen 160 may take. Accordingly, the present disclosure should not be limited to any specific display screen, whether part of a rear projection display device or front projection display device.

A system, such as that of FIG. 1 (e.g., including the line generating elements 200, 250 of FIG. 2), may be operated in such a way as to reduce speckle in an image. By vibrating the line generating element back and forth in a direction substantially transverse to an axis of the optical elements, the speckle may be reduced. The term "substantially transverse", as used throughout this disclosure, means that the movement of the line generating element is less than about 5 degrees from being exactly transverse. The tilt of the vibration direction from the ideal transverse direction results in need for a larger amount of the vibratory motion relative to the designed pitch, p, and hence increases the burden on the vibration mechanism unnecessarily. In addition to the reduction in speckle, the system is capable of maintaining or improving the optical throughput thereof, which is in direct contrast to existing systems.

In one example embodiment, a distance (d) of the vibration is equal to at least about a maximum pitch (p) thereof. In those instances wherein the pitch (p) varies across the line generating element, the vibration would tend to be equal to at least about the maximum pitch. For example, a distance (d) of about 110% of the maximum pitch (p) distance, or greater, might be used in various embodiments. In other embodiments, a distance (d) of at least about 150% of the maximum pitch (p) distance might be used. In those circumstances wherein the pitch (p) is fixed across the line generating element, the vibration would tend to be equal to at least about the fixed pitch, which is in essence the maximum pitch.

In yet another embodiment, an amount of time that it takes for the line generating element to travel the distance (d) is equal to or greater than about a human retina response time. As the human retina response time will typically vary based upon the specific viewer, in one specific embodiment the amount of time that it takes to travel the distance is at most about 16.67 milliseconds. In another embodiment, the amount of time that it takes to travel the distance is at most about 15 milliseconds. Nevertheless, those skilled in the art understand that the present disclosure should not be limited to any specific amount of time, as different applications may require different amounts of time and remain within the fundamental principles described herein.

A system, such as that illustrated in FIG. 1, may further benefit from the vibration of the display screen. While the vibration of the line generating element is most helpful in reducing objective speckle, the vibration of the display screen may be used to reduce subjective speckle. Accordingly, the combination of vibrating the line generating element and the display system may further reduce the occurrence of speckle.

A system, such as that illustrated in FIG. 1, may benefit many types of display systems. In one embodiment, however, the disclosed display system would provide significant advantages to a display system employing scrolling color displays (e.g., a display system that scrolls the illumination RGB colors in temporal sequence). Traditional systems employing scrolling color displays are particularly susceptible to objective speckle, as the artifacts of the objective speckle are more readily apparent to the intended viewer. For example, objective speckle in systems employing scrolling color displays are easily detected by the intended viewer, as they show up as color intensity variations. A single vibrating line generating element, as disclosed herein, could be used to generate the line that is to be scrolled, as well as to make sure that the intensity across this line is uniform. This solution addresses both problems in one optical element.

In another embodiment such as applications where one or more colored lines or stripes are time-sequentially scrolled across the SLM in a certain amount of time, the amount of time that it takes to travel the distance d is at most equal the interval that the line/stripe is present on a certain pixel of the SLM.

Figure 3:
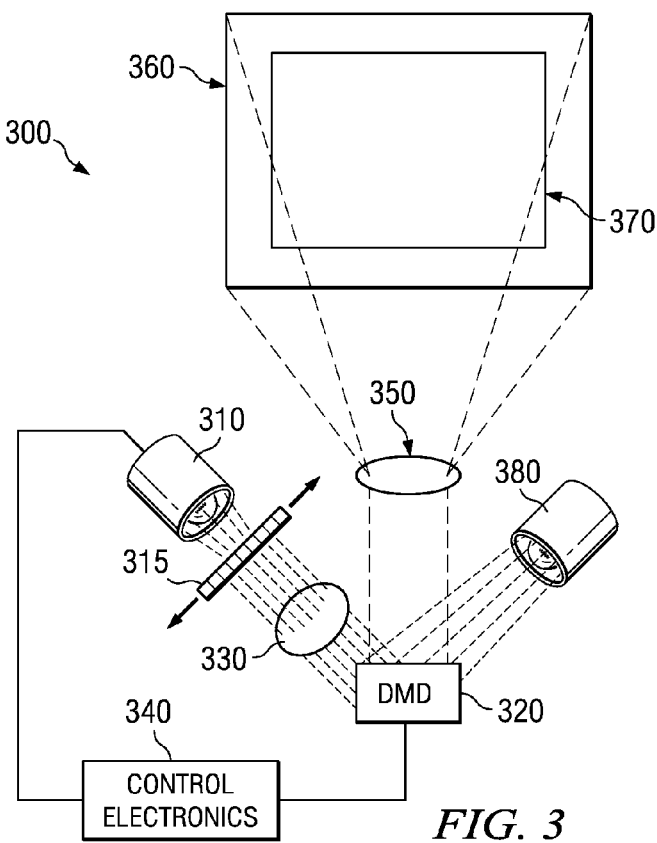
FIG. 3 illustrates a block diagram of a display system (e.g., projection display system) manufactured and operated in accordance with the principles of the disclosure.

FIG. 3 illustrates a block diagram of a display system 300 (e.g., projection display system) manufactured and operated in accordance with the principles of the disclosure. In the display system illustrated in FIG. 3, illumination from a light source 310 (e.g., a coherent light source) is projected toward a line generating element 315. In accordance with the disclosure, the line generating element 315 is vibrated back and forth in a direction transverse to an axis of the optical elements that it comprises, for example to reduce the resulting objective speckle. The light modulated by the line generating element 315 is then focused on to the surface of one or more SLM(s) 320 (e.g., DMD(s) in one embodiment) by means of a condenser lens 330 placed in the path of the light. Control electronics 340 are connected to the line generating element 315, the SLM(s) 320 and the light source 310, and used to control the distance and speed of the line generating element 315, modulate the SLM(s) 320, and to control the light source 310, respectively.

For all SLM pixels in the ON state, the incoming light beam is reflected into the focal plane of a projection lens 350, where it is magnified and projected on to a viewing screen 360 to form an image 370. On the other hand, SLM pixels in the OFF state, as well as any stray light reflected from various near flat surfaces on and around the SLM, are reflected into a light trap 380 and discarded.

As another example, another possible application for the vibrated line generating element may be in optical systems that use narrowband sources such as those filtered from a broadband source, e.g.: arc lamp. Typically, speckle depends upon the line width of the source. A broader line width typically means shorter coherence length and lower speckle. As the line width decreases, the behavior of a certain light source becomes closer to that of a laser (e.g., true coherent light source). As a result, its coherence length increases resulting in higher value of speckle.

Such sources are used in microlithography for depositing fine sub-microscopic features for semiconductor fabrication. Presence of speckle artifacts may result into the presence of grainy patterns on the fine features that are intended to be deposited onto semiconductors by copying from masks through UV exposure of these masks. These grainy patterns may alter the electrical and other properties of the semiconductors in an undesired fashion. Vibrating the line generating element, as disclosed herein, may help mitigate these artifacts and help improve the performance of the fabricated semiconductors.

The term "providing", as used in the context of this disclosure, means that the feature may be obtained from a party having already manufactured the feature, or alternatively may mean manufacturing the feature themselves and providing it for its intended purpose.

Those skilled in the art to which the disclosure relates will appreciate that other and further additions, deletions, substitutions and modifications may be made to the described embodiments without departing from the scope of the disclosure.

What is claimed is:

1. A system for reducing speckle in an image produced from a light source, comprising:
    a light source operable to transmit an input beam of light;
    a line generating element in optical communication with the input beam of light, the line generating element having a collection of optical elements configured to convert the input beam of light into one or more individual line beams of light;
    a vibration source coupled to the line generating element, the vibration source configured to vibrate the line generating element back and forth in a direction substantially transverse to an axis of the collection of optical elements;
    a spatial light modulator positioned in optical communication with the line generating element, the spatial light modulator configured to modulate the one or more individual line beams of light; and
    a display screen positioned to receive the modulated individual line beams of light.

2. The system of claim 1 wherein the collection of optical elements has a fixed pitch, and wherein the vibration source is configured to vibrate the line generating element a distance equal to at least about the fixed pitch.

3. The system of claim 2 wherein the vibration source is configured to vibrate the line generating element at a speed such that an amount of time it takes for the line generating element to travel the distance is equal to or less than about 16.67 milliseconds.

4. The system of claim 1 wherein a layer of material having diffusive properties is located in contact with the line generating element.

5. The system of claim 1 wherein the spatial light modulator includes an array of digital micromirror devices.

6. The system of claim 1, further including an RGB scrolling mechanism configured to scroll the individual line beams of light across the spatial light modulator in temporal sequence.

7. The system of claim 1 wherein the collection of optical elements are substantially parallel to one another.

8. The system of claim 1 wherein the collection of optical elements are not substantially parallel to one another.

9. A system for reducing speckle in an image produced from a light source, comprising:

a light source operable to transmit an input beam of light;

a line generating element in optical communication with the input beam of light, the line generating element having a collection of optical elements configured to convert the input beam of light into one or more individual line beams of light;

a vibration source coupled to the line generating element, the vibration source configured to vibrate the line generating element back and forth in a direction substantially transverse to an axis of the collection of optical elements;

a spatial light modulator positioned in optical communication with the line generating element, the spatial light modulator configured to modulate the one or more individual line beams of light;

a display screen positioned to receive the modulated individual line beams of light; and a second vibration source configured to vibrate the display screen.

\* \* \* \* \*